Patented June 27, 1950

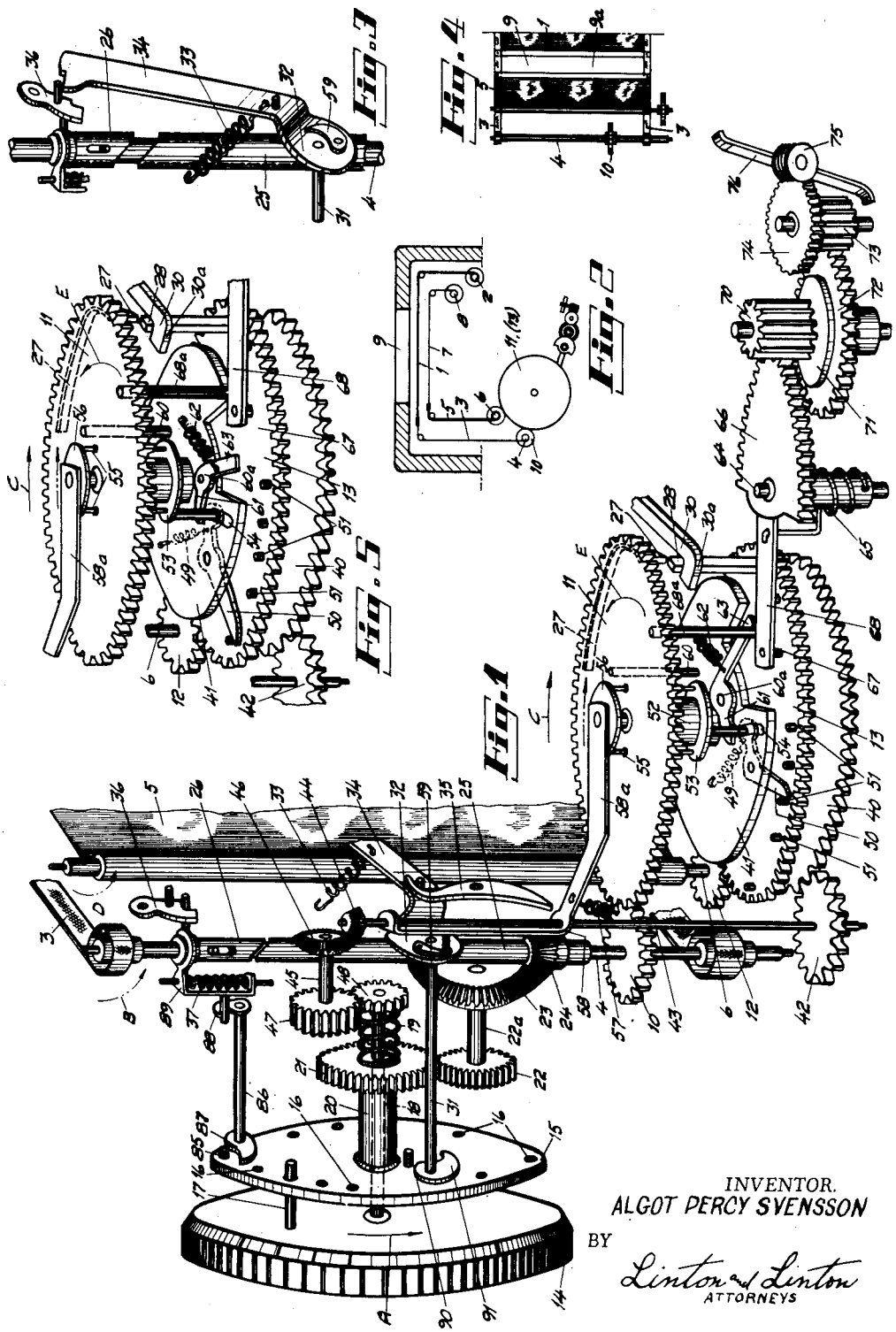

2,512,815

UNITED STATES PATENT OFFICE 2,512,815

PHOTOGRAPHIC CAMERA SHUTTER

Algot Percy Svensson, Goteborg, Sweden

Application March 15, 1949, Serial No. 81,489
In Sweden November 7, 1946

4 Claims. (Cl. 95—57)

This invention relates to photographic shutters of the kind including a pair of curtains wound on spring-actuated rollers. One object of my invention is to provide a shutter mechanism having a single, manually-operable knob for rewinding the shutter to condition it for an exposure and for adjusting the shutter to obtain the required time of exposure. Another object of my invention is to provide a shutter mechanism in which the manually operable knob, when used for setting the shutter to obtain the required time of exposure, is not subjected to the influence of the springs acting on the curtains. Another object of my invention is to provide a shutter which may be set to give the desired exposure time before, after or during the winding operation. Still another object of my invention is to provide a shutter which is noiseless during the actual exposure even when it is set for a comparatively long exposure time, say between ⅕ and 1 second.

In order that the principle of the invention may be readily understood, I have disclosed one embodiment thereof in the accompanying drawings, wherein—

Figure 1 is a diagrammatic perspective view of the shutter actuating and setting mechanism;

Figure 2 shows diagrammatically and in section the curtains and the curtain roller shafts;

Figure 3 is a perspective view of a part of Figure 2;

Figure 4 is a plan view of a part of Figure 2, and

Figure 5 is a perspective view of the setting mechanism in a position different from that shown in Figure 1.

In the drawings, I denotes the curtain which is the first to be actuated when the shutter mechanism is released for an exposure (hereinafter called the first curtain), said curtain thereby being wound up on a spring-actuated roller 2 in conventional manner as a pair of ribbons 3 attached to the trailing edge of the curtain unwind from a rotatably mounted shaft 4 (see Figure 2). A curtain 5 (hereinafter called the second curtain) follows the first curtain and, prior to making the exposure, is wound on a shaft 6 extending parallel to the shaft 4, a pair of ribbons 7 attached to its leading edge being wound on a spring-actuated roller 8 in making an exposure. At the beginning of an exposure, the shaft 4 is released to wind the first curtain on the roller 2 under the influence of the spring acting thereon. As the trailing edge of the first curtain is drawn across the exposure frame 9 of the camera, the shaft 6 is released after a predetermined time interval so that the ribbons 7 are wound on the spring-actuated roller 8 and pull the second curtain 5 to a position in which it covers the exposure frame 9. The mechanism may also be set so that after the first curtain has moved a predetermined distance the shaft 6 is released to free the second curtain. In this case, a slot 9a which is formed between the trailing edge of the first curtain and the leading edge of the second curtain passes in front of the exposure frame and effects the exposure.

On the shaft 4 there is attached a toothed wheel 10 in mesh with a rotatably mounted toothed wheel 11, and on the shaft 6 there is attached a toothed wheel 12 in mesh with a rotatably mounted toothed wheel 13 which is mounted coaxially with the toothed wheel 11. A manually rotatable knob 14 is disposed exteriorly of the camera casing and a rotatably mounted circular disc 15 is arranged coaxially with, and adjacent the inner face of the knob 14, the disc 15 being free to rotate only in the direction indicated by the arrow A in Figure 1. The disc 15 is provided with a series of holes or openings 16 distributed along its periphery for selective engagement by an axially projecting pin 17 on the knob 14 as shown in Figure 1. A shaft 18 to which the knob 14 is rigidly attached is axially slidable, and the knob 14 may be pulled outwardly against the action of a spring coil 19 so as to bring the pin 17 out of engagement with the hole 16. By rotating the knob 14 when it occupies the withdrawn position, the pin 17 may be brought in position in front of any selected one of the holes 16 and will engage therein upon releasing the knob. A toothed wheel 21 fixed to a hub extension 20 of the disc 15 meshes with a pinion 22 rigidly connected to a rotatably mounted shaft 22a to which there is attached a bevel gear wheel 23 meshing with a bevel gear pinion 24 attached to a coupling sleeve 25 which is mounted on the shaft 4 and is angularly, but not axially, displaceable relative thereto. On the shaft 4 there is slidably mounted another coupling sleeve 26 which is prevented from rotating relative to the shaft by conventional means. As the coupling sleeve 26 engages the coupling sleeve 25, the rotation of the latter is transmitted to the shaft 4. By rotating the knob 14 in the direction of the arrow A, when the pin 17 engages one of the holes 16 of the disc 15, a rotational movement is imparted to the shaft 4 in the direction of the arrow B, whereby the ribbons 3 of the curtain 1 are wound up on the shaft 4 and the curtain 1 is brought to the set position shown in Figure 2 in front of the exposure frame 9. The rotation of the shaft 4 is transmitted by means of the toothed wheel 10 to the toothed wheel 11 which is rotated in the direction of the arrow C. A lip 27 provided on the toothed wheel 11 contacts a pin 28 projecting from the toothed wheel 13 and transmits this rotation to the toothed wheel 13, the rotational movement of this wheel being transmitted by means of the toothed wheel 12 to the shaft 6 which is caused to rotate in the direction of the arrow D, whereby the curtain 5 is wound on the shaft 6 and is drawn across the exposure frame 9 to the position shown in Figure 2. This rotation is stopped when the pin 28 contacts a fixed abutment 30 and, as the knob 14 is released, the movable members hereinbefore described are retained in their position owing to the fact that the disc 15 can be rotated only in the direction of the arrow A.

An arm 34 actuated by a coil spring 33 projects from a disc 32 attached to a rotatable shaft 31 and may be retained in the position shown in Figure 1 against the action of said spring by means of a pivotally mounted latch 35. By means of a shutter release lever (not shown), the latch 35 may be swung to a position in which it releases the arm 34. When released, the arm 34 will swing to a position under the influence of the spring 33 in which it pivots to an inoperative position a pawl 36, which normally maintains the coupling sleeve 26 in engagement with the coupling sleeve 25, so that the coupling sleeve 26 is disengaged from the coupling sleeve 25 by means of a spring 37, thus disconnecting the shaft 4 from the disc 15. The roller 2 is now free to wind up the curtain 1 which, in turn, rotates the shaft 4, this winding of the curtain 1 being stopped as the lip 27 of the toothed wheel 11 participating in the movement of the shaft 4 contacts the surface 30a of the abutment 30. By means of mechanisms which will be hereinafter described, the toothed wheel 13, which is connected to the shaft 6 of the second curtain 5 by means of the toothed wheel 12, is locked during the initial movement of the first curtain 1 but is released automatically when the toothed wheel 11 has rotated through a predetermined angle, so that the roller 8 is free to wind up the second curtain 5 after the formation of the slot 9 between the trailing edge of the first curtain 1 and the leading edge of the second curtain. The toothed wheel 13 may also be locked until a certain interval of time has elapsed after winding up the first curtain so that the exposure frame is entirely uncovered for a predetermined length of time.

At the side of the toothed wheel 13 remote from the toothed wheel 11 there is rotatably mounted a toothed wheel 40 arranged coaxially with the first mentioned toothed wheels and having connected rigidly thereto a substantially circular disc 41 situated between the toothed wheels 11 and 13. The toothed wheel 40 meshes with a pinion 42 rigidly attached to one end of a rotatably mounted shaft 43, to the other end of which there is attached a bevel gear 44 meshing with another bevel gear 46 attached to a rotatably mounted shaft 45. To said shaft 45 there is attached a cylindrical toothed wheel 47 permanently meshing with a toothed wheel 48 attached to the shaft 19 of the knob 14, so that by rotating the knob 14 the toothed wheel 40 and the disc 41 are rotated in the appropriate direction. A pawl 50, in the form of a double-armed lever actuated by a spring 49, is pivotally mounted on the disc 41 and is adapted to co-operate with a series of axially projecting pins 51 distributed around the toothed wheel 13. Normally the pawl 50 is restrained from engagement with said pins 51 by means of a ring 53 axially adjustable along the hub 52 of the toothed wheel 11 and engaging a pin 54 projecting from the pawl 50 and passing through a recess in the disc 41, the pin 54 being held against the peripheral edge of said ring 53 by means of the spring 49. The ring 53 is connected by means of two thin rods 55 passing through apertures in the toothed wheel 11 to a yoke 56, which is rotatably carried by the free end of an arm 58a projecting from a slide 58 actuated by a spring 57 and slidable on the shaft 43. A lip 59 carried by the disc 32 is adapted to co-operate with a projection (not shown) on the slide 58 to move the latter upwardly (as viewed in Figure 1) against the action of the spring 57 as the disc 32 performs its aforesaid angular movement from the position shown in Figure 1 to the position shown in Figure 3. By means of this upward movement of the slide 58, the ring 53 is pulled towards the toothed wheel 11 and away from the pin 54 so that the latch 50 under the action of the spring 49 is free to swing to the position shown in Figure 1 in which it engages the pin 51 disposed in front thereof and prevents the angular displacement of the toothed wheel 13. In this position of the latch 50, the ring 53 is restrained by the pin 54, against the free end of which the ring 53 is urged by the spring 57 as the slide 58, at the end of the aforesaid angular movement of the disc 32, is released by the lip 59.

A pin 60 is attached to the toothed wheel 11 and is directed towards the ring 53 which, at its edge, is provided with a recess for the reception of said pin. As the toothed wheel 11 rotates in the direction of the arrow E the pin 60 contacts the pin 54 carried by the latch 50 and swings the latch back to the inoperative position. In this position of the latch 50 the ring 53 is no longer supported by the pin 54 and the ring 53 returns to the lowered position under the influence of the spring 57. Thus, upon release of the latch 50, the toothed wheel 13 is free to rotate and the roller 8 can wind up the second curtain 5 from the shaft 6. The width of the slot 9 between the first curtain 1 and the second curtain 5 is dependent on the position in which the disc 41 carrying the latch 50 has been set in relation to the toothed wheels 11 and 13. The angular distances between the pins 51 of the toothed wheel 13 correspond to the angular distances between the holes 16 of the disc 15 and, by pulling out the knob 14 so as to disengage the pin 17 from the disc 15 and turning the knob in the appropriate direction, it is possible to set the disc 41 carrying the latch 50 in any desired angular position and, consequently, to pre-set the size of the slot 9 formed between the curtains 1 and 5 when releasing the shutter mechanism for an exposure. It is to be observed that this setting can be performed before, during or after bringing the curtains to the position shown in Figures 1 and 2, i. e. the position ready for exposure.

When rotating the disc 15 by means of the knob 14 in order to bring the shutter parts to the position shown in Figure 2, a pin 85 projecting from the disc 15 contacts an arm 87 projecting from a rotatably mounted shaft 86 and rotates said shaft through a certain angle. Another arm 88 projecting from the shaft 86 actuates a slide 89 against the action of the spring 37 to move the coupling sleeve 26 into engagement with the coupling sleeve 25, the two sleeves being locked together by means of the latch 36. To the disc 15 there is attached another projecting pin 90 which, upon further angular movement of the knob 14, contacts an arm 91 projecting from the shaft 31 and swings the disc 32 and the arm 34 from the position shown in Figure 3 to the position shown in Figure 1, whereby the latch 35 (adapted to be actuated by the shutter release lever) retains the arm 34 in the last mentioned position. The knob is provided in known manner with a dial indicating the exposure time corresponding to the width of the exposure slot selected by setting the disc 41 carrying the latch 50.

The method of operation hereinbefore described takes place when the disc 41 is set in angular positions, in which the pin 60 of the toothed wheel 11 contacts the pin 54 of the latch 50 before the front edge of the lip 27 contacts the surface 30a of the abutment 30 and stops the rotation of the toothed wheel 11. Such an angular position of the disc 41 is shown in Figure 5. The exposure times obtained by such angular positions of the disc 41 may be varied between 1/1600 and 1/25 second.

When a somewhat longer exposure time is desired, for instance 1 to 1/10 second, the disc 41 is set by means of the knob 14 in, or in the vicinity of, the angular position shown in Figure 1. In this position of the disc 41 the latch 50 is brought out of engagement with the pin 51 by means of a two-armed lever 60a pivotally mounted on the disc 41. One arm 61 of the lever 60a is kept in contact with the pin 54 of the latch 50 by means of a spring 62 and, in said position of the lever 60a, the other lever arm 63 is directed substantially radially from the centre of revolution of the disc 41. At a distance from the disc 41 there is pivotally mounted on a shaft 64 a toothed segment 66 having an actuating spring 65 and an arm 68 projecting towards the disc 41 and provided at its free end with a pin 67. To the toothed wheel 11 there is attached a pin 68a directed towards the toothed wheel 13 and adapted to turn the arm 68 against the action of the spring 65 when the toothed wheel 11 as aforesaid is rotated in the direction of the arrow C. In this position of the arm 68, the pin 67 is disposed at a distance from the lever arm 63, said distance being dependent on the angular position in which the disc 41 has been set. The toothed segment 66 meshes with a rotatably mounted pinion 70 which is coupled by means of a uni-directional coupling 71 to a toothed wheel 72 meshing with a pinion 73 attached to a worm wheel 74. This worm wheel 74 drives a worm 75 to which an air propeller 76 is attached.

When releasing the shutter mechanism by actuating the latch 35 by means of the shutter release lever (not shown), the arm 34 is released and, under the action of the spring 33, is moved angularly to a position in which the latch 36 is caused to release the coupling sleeve 26, whereupon the roller 2 is free to wind up the first curtain 1 from the exposure frame 9. Rotation of the shaft 4 rotates the toothed wheel 11 in the direction of the arrow E so that the pin 68a releases the arm 68 which, under the influence of the spring 65, commences to move towards the lever arm 63, being retarded by the air propeller 76. When the pin 67 contacts the lever arm 63, the lever 60a is pivoted so as to bring the latch 50 out of engagement with the pin 51 on the toothed wheel 13, thus allowing the roller 8 to wind the ribbons 7 of the second curtain 5 to a position in front of the exposure frame 9. As the latch 50 is disengaged from the pin 51, the ring 53 is free to enter between the pin 54 and the hub 52 so that the latch 50 is retained in an inoperative position when, at the completion of an exposure, the shutter is again brought to a position ready for the next exposure, the pin 68a on the toothed wheel 11 again swinging the arm 68 to the position shown in Figure 1.

It will be evident without further explanation that the interval of time between winding the first curtain 1 and the release of the second curtain 5 is dependent on the angle through which the arm 68 after having been released by the pin 68a, has to pass through before its pin 67 contacts the arm 63, said angle being dependent on the angular position in which the disc 41 is set by means of the knob 14 relative to the toothed wheels 11 and 13. The angular distances between the holes 16 of the disc 15 correspond to the angular distances between the pins 50 and the dial of the knob 14 indicates the exposing time corresponding to the selected angular position of the disc 41.

From the above description it will be obvious that for short exposure times, for instance from $1/25$ to $1/1500$ second, the disc 41 is set relative to the toothed wheels 11 and 13 by means of the knob 14 so that the wheel 11 restraining the first curtain 1 must rotate, when released, a greater or smaller angle before its pin 60 contacts the pin 54 of the latch 50 and by swinging the latch 50 to an inoperative position releases the toothed wheel 13 restraining the second curtain 5 so that the latter is free to follow the first curtain 1. For longer exposure times, for instance from 1 to 1/10 second, the disc 41 is set in such an angular position relative to the toothed wheels 11 and 13 that when the toothed wheel 11 is released for making an exposure its angular movement is stopped by the lip 27 as its front edge contacts the surface 30a of the abutment 30 before the pin 60 reaches the pin 54 of the latch 51. Furthermore, the angular position of the disc 41 is such that the lever arm 63 is disposed at a greater or smaller distance from the pin 67 of the arm 68, and a longer or shorter time will pass, before the pin 67 of the arm 68 released by the pin 68a at the beginning of the rotation of the toothed wheel 11, contacts the lever arm 63 and releases the toothed wheel 13 restraining the second curtain 5.

What I claim is:

1. A shutter mechanism for photographic cameras including a first curtain and a second curtain, each curtain having a spring roller at one end and a lockable roller at the other end for retaining the curtain in a set position, a manually rotatable knob capable of being set in two different axial positions, means for transmitting the rotation of said knob, when occupying one of its axial positions, to the lockable roller of the first curtain for winding up said curtain on said roller against the tension of its spring roller, means for transmitting said rotational movement of the lockable roller of the first curtain to the lockable roller of the second curtain for winding up said second curtain on its lockable roller against the action of its spring roller, said movement transmitting means comprising two coaxial, rotatable toothed wheels meshing respectively with pinions attached to the lockable roller of the first curtain and the lockable roller of the second curtain and between said toothed wheels a uni-directional coupling, a rotatable disc mounted coaxially with said toothed wheels, means for transmitting the rotation of the knob, when occupying its other axial position, to said disc for setting said disc in different angular positions, means for locking the toothed wheel meshing with the pinion of the lockable roller of the second curtain to said disc in different angular positions of said disc, means for manually releasing the lockable roller of the first curtain, and means operable by the toothed wheel meshing with the pinion attached to the lockable roller of the first curtain for unlocking said locking means when the last mentioned toothed wheel reaches a predetermined angular position.

2. A shutter mechanism for photographic cameras including a first curtain and a second curtain, each curtain having a spring roller at one end and a lockable roller at the other end for retaining the curtain in a set position, a manually rotatable knob capable of being set in two different axial positions, means for transmitting the rotation of said knob, when occupying one of its axial positions, to the lockable roller of the first curtain for winding up said curtain on said roller against the tension of its spring roller, means for transmitting said rotation of the lockable roller of the first curtain to the lockable roller of the second curtain for winding up said second curtain on its lockable roller against the action of its spring roller, said movement transmitting means comprising two coaxial, rotatable toothed wheels meshing respectively with pinions attached to the lockable roller of the first curtain and the lockable roller of the second curtain and between said toothed wheels a uni-directional coupling, a rotatable disc mounted coaxially with said toothed wheels, means for transmitting the rotation of the knob, when occupying its other axial position, to said disc for setting said disc in different angular positions, a latch pivotally mounted on said disc and adapted to co-operate with a series of pins distributed along the edge of the toothed wheel meshing with the pinion attached to the lockable roller of the second curtain to lock said toothed wheel to said disc in different angular positions of the latter, and a projection fixed to the toothed wheel meshing with the pinion of the lockable roller of the first curtain and capable of unlocking said latch when the last mentioned toothed wheel reaches a predetermined angular position.

3. A shutter mechanism for photographic cameras including a first curtain and a second curtain, each curtain having a spring roller at one end and a lockable roller at the other end for retaining the curtain in a set position a manually rotatable knob capable of being set in two different axial positions, means for transmitting the rotation of said knob, when occupying one of its axial positions, to the lockable roller of the first curtain for winding up said curtain on said roller against the tension of its spring roller, means for transmitting said rotation of the lockable roller of the first curtain to the lockable roller of the second curtain for winding up said second curtain on its lockable roller against the action of its spring roller, said movement transmitting means comprising two coaxial, rotatable toothed wheels meshing respectively with pinions attached to the lockable roller of the first curtain and the lockable roller of the second curtain and between said toothed wheels a uni-directional coupling, a rotatable disc mounted coaxially with said toothed wheels, means for transmitting the rotation of the knob, when occupying its other axial position, to said disc for setting said disc in different angular positions, a spring-actuated latch pivotally mounted on said disc and adapted to co-operate with a series of pins distributed along the edge of the toothed wheel meshing with the pinion attached to the lockable roller of the second curtain, means for normally holding said latch out of engagement with said pins and for releasing said latch when the shutter mechanism is released for an exposure, so as to permit the latch to engage the pin in front thereof and to lock said toothed wheel to said disc in the pre-set angular position of the latter, and a projection fixed to the toothed wheel meshing with the pinion of the lockable roller of the first curtain and capable of unlocking said latch when the last mentioned toothed wheel reaches a predetermined angular position.

4. A shutter mechanism for photographic cameras including a first curtain and a second curtain, each curtain having a spring roller at one end and a lockable roller at the other end for retaining the curtain in a set position, a manually rotatable knob capable of being set in two different axial positions, means for transmitting the rotation of said knob, when occupying one of its axial positions, to the lockable roller of the first curtain for winding up said curtain on said roller against the tension of its spring roller, means for transmitting said rotation of the lockable roller of the first curtain to the lockable roller of the second curtain for winding up said second curtain on its lockable roller against the action of its spring roller, said movement transmitting means comprising two coaxial, rotatable toothed wheels meshing respectively with pinions attached to the lockable roller of the first curtain and the lockable roller of the second curtain and between said toothed wheels a uni-directional coupling, a rotatable disc mounted coaxially with said toothed wheels, means for transmitting the rotation of the knob, when occupying its other axial position, to said disc for setting said disc in different angular positions, a spring-actuated latch pivotally mounted on said disc and adapted to co-operate with a series of pins distributed along the edge of the toothed wheel meshing with the pinion attached to the lockable roller of the second curtain, means for normally holding said latch out of engagement with said pins and for releasing said latch when the shutter mechanism is released for an exposure, so as to permit the latch to engage the pin in front thereof and to lock said toothed wheel to said disc in the pre-set angular position of the latter, a double-armed lever pivotally mounted on said disc and capable of movement to unlock said latch, a spring-actuated arm pivotally mounted in the proximity of the disc and directed substantially towards the disc, a projection attached to the toothed wheel meshing with the pinion of the lockable roller of the first curtain and capable of holding said arm against the action of its spring as the shutter mechanism is set and of releasing said arm as the shutter mechanism is released for an exposure, one arm of said lever normally projecting substantially radially with respect to the centre of rotation of the disc and disposed in the path of movement of said spring-actuated arm at a distance therefrom dependent on the angular position in which the disc is set, and an air propeller driven by said spring-actuated arm in order to retard the swinging movement of said spring-actuated arm towards said lever arm, said spring-actuated arm being capable of swinging said lever so as to unlock said latch, whereby the toothed wheel meshing with the pinion of the lockable roller of the second curtain is released.

ALGOT PERCY SVENSSON.

REFERENCES CITED

The following references are of record in the file of this patent:

UNITED STATES PATENTS

| Number | Name | Date |
|---|---|---|
| 807,149 | Berger | Dec. 12, 1905 |
| 2,257,012 | Hineline | Sept. 23, 1941 |